(12) United States Patent
Hunt et al.

(10) Patent No.: US 9,264,225 B1
(45) Date of Patent: Feb. 16, 2016

(54) QUANTUM COMMUNICATION USING QUANTUM TELEPORTATION

(71) Applicant: The Boeing Company, Chicago, IL (US)

(72) Inventors: Jeffrey H. Hunt, Thousand Oaks, CA (US); Wayne R. Howe, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 259 days.

(21) Appl. No.: 13/778,944

(22) Filed: Feb. 27, 2013

(51) Int. Cl.
*H04L 9/08* (2006.01)

(52) U.S. Cl.
CPC .................................... *H04L 9/0852* (2013.01)

(58) Field of Classification Search
None
See application file for complete search history.

(56) References Cited

U.S. PATENT DOCUMENTS

| 7,881,473 | B2 | 2/2011 | Wang et al. | |
|---|---|---|---|---|
| 8,200,093 | B2* | 6/2012 | Hunt | H04B 10/1125 398/115 |
| 8,762,728 | B2* | 6/2014 | Wiseman | H04L 9/0838 380/256 |
| 2004/0184603 | A1* | 9/2004 | Pearson | H04L 9/0855 380/28 |
| 2004/0206888 | A1* | 10/2004 | Klotzer | B82Y 10/00 250/216 |
| 2005/0138359 | A1* | 6/2005 | Simon | H04L 63/0823 713/156 |
| 2005/0249352 | A1* | 11/2005 | Choi | H04L 9/0852 380/286 |
| 2009/0097862 | A1* | 4/2009 | Munro | B82Y 10/00 398/175 |
| 2009/0114925 | A1* | 5/2009 | Ajiki | B82Y 10/00 257/79 |
| 2009/0317089 | A1* | 12/2009 | Peters | H04L 9/0855 398/173 |
| 2010/0046754 | A1* | 2/2010 | Gilfedder | H04B 10/70 380/255 |

(Continued)

OTHER PUBLICATIONS

Bashar et al., "A Review and Prospects of Quantum Teleportation," Masaum Journal of Basic and Applied Sciences, vol. 1, No. 2, Sep. 2009, pp. 296-301.
Hughes et al., "Practical Free-Space Quantum Key Distribution Over 10 Km in Daylight and at Night," New Journal of Physics 4, Jul. 2002, pp. 43.1-43.14.
Buttler et al., "Daylight Quantum Key Distribution Over 1.6 Km," Feb. 1, 2008, 4 pages, accessed Feb. 1, 2013. http://arxiv.org/abs/quant-ph/0001088.
Braunstein et al., "Teleportation of Continuous Quantum Variables," Physical Review Letters, vol. 80, No. 4, Jan. 26, 1998, pp. 869-872.

(Continued)

*Primary Examiner* — Dede Zecher
*Assistant Examiner* — Richard McCoy
(74) *Attorney, Agent, or Firm* — Yee & Associates, P.C.

(57) ABSTRACT

A method and apparatus for sending encrypted data across a node in a communications network. In one illustrative embodiment, an apparatus comprises a first communicator, a second communicator, and a number of nodes. The first communicator is configured to encrypt unencrypted data to form the encrypted data using a first quantum key distributor. The second communicator is configured to decrypt the encrypted data using a second quantum key distributor. The number of nodes is configured to receive the encrypted data sent from the first communicator and send the encrypted data to the second communicator using quantum teleportation. The encrypted data remains encrypted as the encrypted data passes through each of the number of nodes.

20 Claims, 5 Drawing Sheets

(56) References Cited

U.S. PATENT DOCUMENTS

| | | | |
|---|---|---|---|
| 2010/0252745 A1* | 10/2010 | Hunt | G01S 7/4861 250/372 |
| 2011/0090841 A1* | 4/2011 | Shyy | H04W 88/04 370/319 |
| 2012/0050834 A1* | 3/2012 | Harrison | B82Y 10/00 359/107 |
| 2012/0093521 A1* | 4/2012 | Harrison | B82Y 10/00 398/173 |
| 2012/0148237 A1* | 6/2012 | Harrison | B82Y 10/00 398/37 |
| 2012/0195597 A1* | 8/2012 | Malaney | H04L 9/0852 398/115 |
| 2013/0251145 A1* | 9/2013 | Lowans | H04L 9/0838 380/44 |

OTHER PUBLICATIONS

Hunt et al., "Anti-Hacking System for Quantum Communication," U.S. Appl. No. 14/336,114, filed Jul. 21, 2014, 51 pages.

Office Action, dated Sep. 8, 2015, regarding U.S. Appl. No. 14/336,114, 24 pages.

* cited by examiner

QUANTUM COMMUNICATION USING QUANTUM TELEPORTATION

BACKGROUND INFORMATION

1. Field

The present disclosure relates generally to quantum communication and, in particular, to quantum communication within a communications network. Still more particularly, the present disclosure relates to an apparatus and method for sending quantum encrypted data across nodes in a communications network using quantum teleportation.

2. Background

Quantum communication involves encoding information in quantum bits. As used herein, a "quantum bit," which may be also referred to a qubit, is a two-state quantum mechanical system. The quantum mechanical system may be realized using, for example, without limitation, the polarization of a single photon. The qubit may have two polarization states, vertical polarization and horizontal polarization. Quantum mechanics allows a qubit to be in one state, the other state, or a superposition of both states at any given point in time.

Quantum cryptography is the use of quantum mechanical effects to perform cryptographic tasks, such as, for example, encrypting and decrypting data. Quantum key distribution is a widely used quantum cryptographic technique that allows secure point-to-point communication. Point-to-point communication may be communication between a sender and a receiver over a direction communications channel between the sender and the receiver.

With quantum key distribution, the sender and the receiver may produce a shared random encryption key that is known only to them. The random encryption key may be a set of data bits that have been encoded using qubits. The sender encrypts the data using the random encryption key and sends this quantum encrypted data to the receiver. The receiver decrypts the quantum encrypted data using the random encryption key. This type of quantum encryption may ensure secure communications over standard communications channels, such as, for example, unsecure public communications channels.

However, this type of quantum cryptographic technique may require a direct connection between the sender and the receiver for the generation and sharing of the random encryption key. Consequently, using quantum key distribution to send encrypted data over a large communications network comprised of multiple nodes may be more difficult than desired and, in some cases, may not be feasible.

Some currently available methods for transporting an encryption key from a sender to a receiver across multiple nodes within a communications network may require that each of the nodes have quantum key distribution capabilities. In some cases, routing algorithms, graph theory algorithms, and metrics that have been disseminated to all nodes within the communications network may be used to transport encryption keys across these nodes.

However, these types of methods may be more time-consuming than desired and/or may require more processing power, hardware resources, and/or software resources than desired. Further, ensuring that every node within a communications network has quantum key distribution capabilities may be more expensive than desired. Therefore, it would be desirable to have a method and apparatus that takes into account at least some of the issues discussed above, as well as other possible issues.

SUMMARY

In one illustrative embodiment, an apparatus comprises a first communicator, a second communicator, and a number of nodes. The first communicator is configured to encrypt unencrypted data to form encrypted data using a first quantum key distributor. The second communicator is configured to decrypt the encrypted data using a second quantum key distributor. The number of nodes is configured to receive the encrypted data sent from the first communicator and send the encrypted data to the second communicator using quantum teleportation. The encrypted data remains encrypted as the encrypted data passes through each of the number of nodes.

In another illustrative embodiment, a quantum teleporter comprises an entanglement creator and an entanglement remover. The entanglement creator is configured to create a pair of entangled photons. A first entangled photon in the pair of entangled photons is sent to meet with an incoming photon. A second entangled photon in the pair of entangled photons is output from the quantum teleporter as an outgoing photon. The entanglement remover is configured to receive the incoming photon and the first photon. The entanglement remover is further configured to receive the incoming photon and the first entangled photon and to remove an entanglement between the first entangled photon and the second entangled photon to form the outgoing photon in which a quantum state of the incoming photon is simultaneously transferred to the outgoing photon.

In yet another illustrative embodiment, a method for sending encrypted information across a node in a communications network is provided. An incoming photon carrying the encrypted information is received at the node. A quantum state of the incoming photon is transferred to an outgoing photon such that encrypted information carried in the incoming photon is teleported to the outgoing photon. The outgoing photon carrying the encrypted information is sent to a next node in the communications network.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method for allowing a first communicator to send quantum encrypted data to a second communicator across one or more nodes in a communications network. In particular, the illustrative embodiments recognize and take into account that it may be desirable to have a method for sending quantum encrypted data across a node in a communications network without requiring that node to have quantum key distribution capabilities.

Thus, the illustrative embodiments provide an apparatus and method for sending quantum encrypted data across a node. In one illustrative example, the node receives an input signal comprised of incoming photons carrying encrypted data. Quantum states of the incoming photons are transferred to outgoing photons using quantum teleportation such that the encrypted data is transferred, or copied, to the outgoing photons. An output signal comprised of the outgoing photons carrying the encrypted data may then be sent out from the node to a next node.

In this manner, the node may be capable of handling the encrypted data without needing to decrypt the encrypted data or have knowledge of the encryption key used to encrypt the data. More specifically, the node may use quantum teleportation to route the encrypted data received at the node to the next node without altering the encrypted data.

Figure 1:
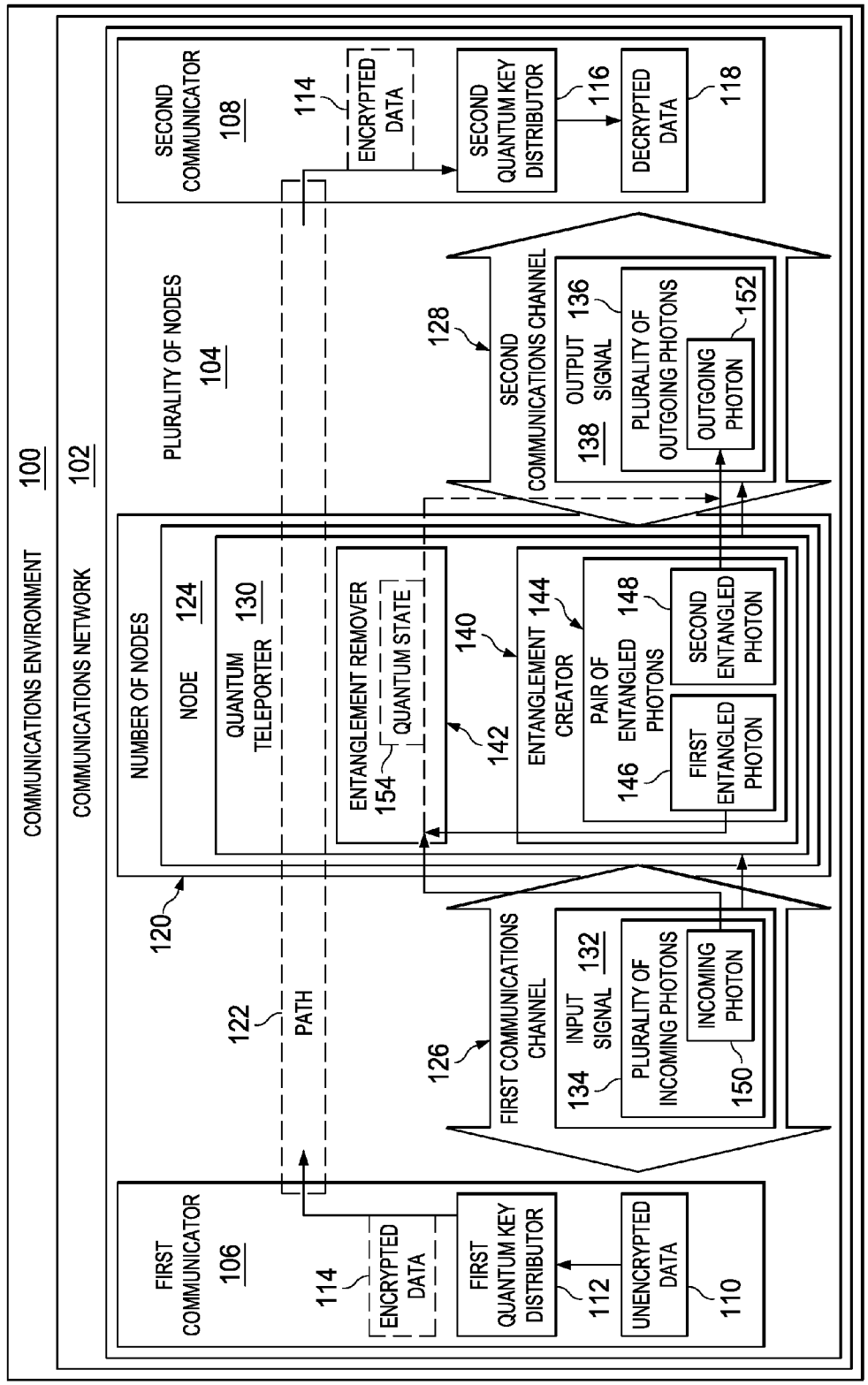
FIG. 1 is an illustration of a communications environment in the form of a block diagram in accordance with an illustrative embodiment.

Referring now to the figures and, in particular, with reference to FIG. 1, an illustration of a communications environment is depicted in the form of a block diagram in accordance with an illustrative embodiment. Communications environment 100 includes communications network 102. Communications network 102 may be comprised of plurality of nodes 104.

As used herein, a "node" in plurality of nodes 104 may be implemented in a number of different ways. For example, without limitation, a node may comprise at least one of a communications device, a switching device, a network switch, a router, a processor unit, a computer, an integrated circuit, a modem, a hub, a server, a workstation, a digital handset, or some other type of communications device.

As used herein, the phrase "at least one of," when used with a list of items, means different combinations of one or more of the listed items may be used and only one of the items in the list may be needed. For example, "at least one of item A, item B, and item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination. The item may be a particular object, thing, or a category. In other words, "at least one of" means any number of and any combination of items may be used from the list, but not all of the items in the list may be required.

First communicator 106 and second communicator 108 may be examples of nodes in plurality of nodes 104. First communicator 106 is configured to send secure data to second communicator 108. For example, first communicator 106 may encrypt unencrypted data 110 using first quantum key distributor 112 to form encrypted data 114. Second communicator 108 may receive encrypted data 114 and then decrypt encrypted data 114 using second quantum key distributor 116 to form decrypted data 118. Decrypted data 118 may contain unencrypted data 110. In this manner, second quantum key distributor 116 may decrypt encrypted data 114 to retrieve unencrypted data 110.

In this illustrative example, first quantum key distributor 112 and second quantum key distributor 116 may be implemented using standard quantum key distribution protocols. First quantum key distributor 112 and second quantum key distributor 116 may communicate over a quantum channel (not shown in this view) to share a quantum encryption key that may be used to encrypt and decrypt data. In this manner, encrypted data 114 may be quantum encrypted data.

The quantum encryption key may be comprised of one or more qubits. In some cases, the quantum encryption key may be a continuous stream of qubits. Further, depending on the implementation, the quantum encryption key may or may not be random.

In one illustrative example, first quantum key distributor 112 may include an encryptor configured to receive a random number from a random number generator. The random number generator may be implemented within or outside of first quantum key distributor 112. The encryptor may use the random number to encrypt unencrypted data 110 and form encrypted data 114.

As depicted, encrypted data 114 may be sent from first communicator 106 to second communicator 108 across number of nodes 120 along path 122. As used herein, a "number of," when used in reference to items, may mean one or more items. In this manner, number of nodes 120 may be one or more nodes.

In this illustrative example, path 122 may comprise the sequence of nodes in communications network 102 through which encrypted data 114 is transmitted. Path 122 may include first communicator 106, second communicator 108, and number of nodes 120. Number of nodes 120 may use quantum teleportation to send encrypted data 114 received at number of nodes 120 from first communicator 106 to second communicator 108. By using quantum teleportation, encrypted data 114 may remain encrypted as encrypted data 114 passes through number of nodes 120.

Node 124 is an example of one of number of nodes 120. Node 124 may be configured to receive encrypted data 114 over first communications channel 126 and send out encrypted data 114 over second communications channel 128. As used herein, a "communications channel," such as first communications channel 126 and second communications channel 128, may be selected from a group that includes a wired communications channel, a wireless communications channel, an optical communications channel, a fiberoptic channel, a waveguide, or some other type of communications channel or link.

Node 124 uses quantum teleporter 130 to receive and send out encrypted data 114. In particular, quantum teleporter 130 may receive input signal 132 over first communications channel 126 from a previous node with respect to path 122. This previous node may be first communicator 106 or one of number of nodes 120. Input signal 132 may be comprised of plurality of incoming photons 134 arriving at quantum teleporter 130 over time.

Quantum teleporter 130 uses plurality of incoming photons 134 to form plurality of outgoing photons 136. Quantum teleporter 130 sends out plurality of outgoing photons 136 in the form of output signal 138 over second communications channel 128 to a next node with respect to path 122.

As depicted, quantum teleporter 130 includes entanglement creator 140 and entanglement remover 142. Entanglement creator 140 is configured to create pair of entangled photons 144 for each one of plurality of incoming photons 134 received. Pair of entangled photons 144 includes first entangled photon 146 and second entangled photon 148. First entangled photon 146 and second entangled photon 148 may be considered entangled when the quantum state of each of these photons may need to be described with reference to the other photon, even though the two photons may be physically separated.

First entangled photon 146 is sent to meet with one of plurality of incoming photons 134. For example, first entangled photon 146 may be sent to meet with incoming photon 150 in entanglement remover 142. Second entangled photon 148 may be sent in a different direction as outgoing photon 152. Incoming photon 150 may carry encrypted information.

Entanglement remover 142 receives both incoming photon 150 and first entangled photon 146. In response to receiving both incoming photon 150 and first entangled photon 146, entanglement remover 142 removes, or destroys, the entanglement between first entangled photon 146 and second entangled photon 148.

When the entanglement between first entangled photon 146 and second entangled photon 148 is removed, outgoing photon 152 is formed. Simultaneously, quantum state 154 of incoming photon 150 is transferred to, or copied to, outgoing photon 152. The transferring of quantum state 154 of incoming photon 150 to outgoing photon 152 results in the encrypted information that is carried by incoming photon 150 being teleported to outgoing photon 152. Outgoing photon 152 carrying the encrypted information may then be sent out, or output, from quantum teleporter 130.

As a result of this quantum teleportation, outgoing photon 152 output from quantum teleporter 130 may be relatively indistinguishable from incoming photon 150 received at quantum teleporter 130. In this manner, encrypted data 114 carried by plurality of incoming photons 134 may be teleported to plurality of outgoing photons 136 without ever being decrypted, modified, or processed in some other manner.

Each node in plurality of nodes 104 may have a quantum teleporter similar to quantum teleporter 130. In this manner, quantum teleportation may be used to send quantum encrypted data across one or more of plurality of nodes 104 in communications network 102.

The illustration of communications network 102 within communications environment 100 in FIG. 1 is not meant to imply physical or architectural limitations to the manner in which an illustrative embodiment may be implemented. Other components in addition to or in place of the ones illustrated may be used. Some components may be optional. Additionally, the blocks are presented to illustrate some functional components. One or more of these blocks may be combined, divided, or combined and divided into different blocks when implemented in other illustrative embodiments.

For example, although first quantum key distributor 112 is depicted as being part of first communicator 106, first quantum key distributor 112 may be considered separate from first communicator 106, but in communication with first communicator 106 in other examples. Similarly, although second quantum key distributor 116 is depicted as being part of second communicator 108, second quantum key distributor 116 may be considered separate from second communicator 108, but in communication with second communicator 108 in other examples.

Further, although the illustrative embodiments have been described using photons, some other type of quantum mechanical system may be used. For example, without limitation, input signal 132 may be comprised of a plurality of incoming electrons and output signal 138 may be comprised of a plurality of outgoing electrons. In other words, quantum communications and quantum cryptography between plurality of nodes 104 may be implemented using electrons instead of photons, or some other type of quantum mechanical system that may be used to form qubits.

Figure 2:
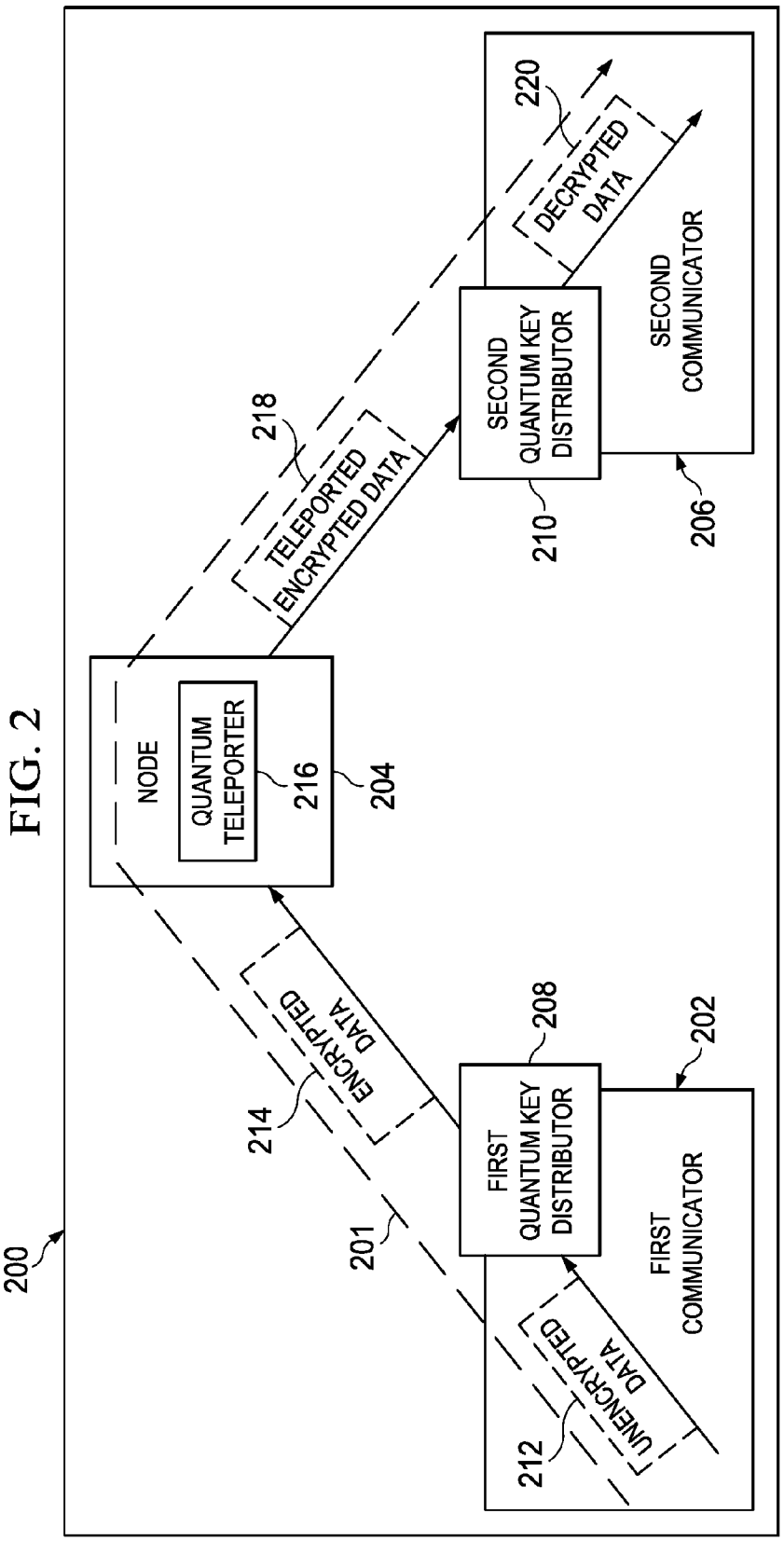
FIG. 2 is an illustration of a path within a communications network in accordance with an illustrative embodiment.

With reference now to FIG. 2, an illustration of a path within a communications network is depicted in accordance with an illustrative embodiment. Communications network 200 is an example of one implementation for communications network 102 in FIG. 1. Path 201 through communications network 200 includes first communicator 202, node 204, and second communicator 206. First communicator 202, node 204, and second communicator 206 are examples of implementations for first communicator 106, node 124, and second communicator 108, respectively, in FIG. 1.

As depicted, first communicator 202 is configured to encrypt unencrypted data 212 using first quantum key distributor 208 to form encrypted data 214. First communicator 202 sends encrypted data 214 to node 204. Node 204 uses quantum teleporter 216 to teleport the encrypted data and output teleported encrypted data 218. Second communicator 206 uses second quantum key distributor 210 to decrypt teleported encrypted data 218 and form decrypted data 220.

Figure 3:
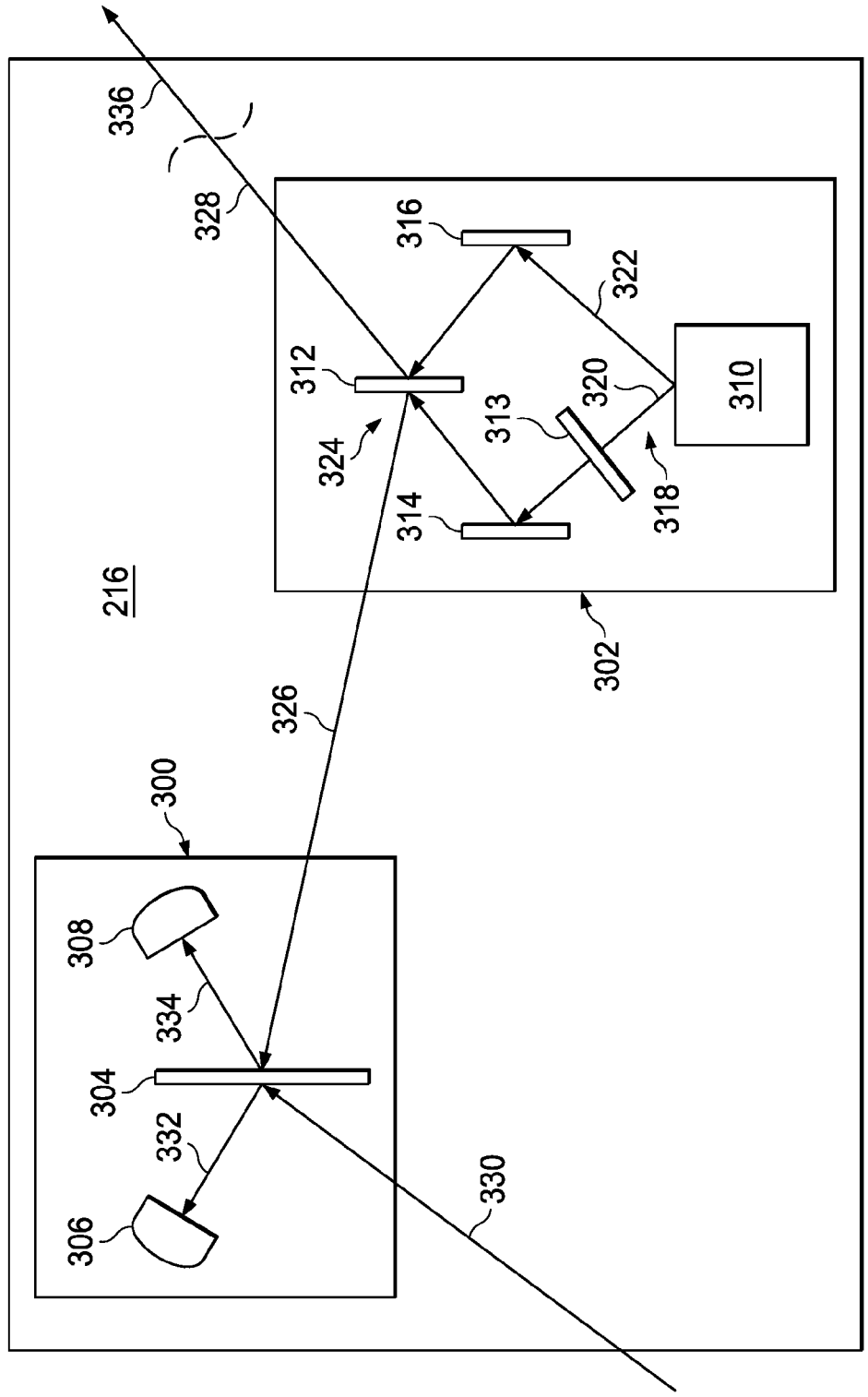
FIG. 3 is an illustration of a quantum teleporter in accordance with an illustrative embodiment.

With reference now to FIG. 3, an illustration of quantum teleporter 216 from FIG. 2 is depicted in accordance with an illustrative embodiment. In this illustrative example, quantum teleporter 216 includes entanglement remover 300 and entanglement creator 302. Entanglement remover 300 includes beam splitter 304, detector 306, and detector 308. Entanglement creator 302 includes coupled photon creator 310, beam splitter 312, wave plate 313, mirror 314, and mirror 316.

As depicted, coupled photon creator 310 is configured to create pair of coupled photons 318. Pair of coupled photons 318 includes first photon 320 and second photon 322. In one illustrative example, coupled photon creator 310 may include a laser, an intensity control device, a polarization control device, a frequency control device, and a nonlinear optical element. The nonlinear optical element may be used to convert a single laser photon emitted from the laser into pair of coupled photons 318.

Beam splitter 312 in entanglement creator 302 may be used to entangle first photon 320 and second photon 322. Prior to becoming entangled with second photon 322, first photon 320 may be sent through wave plate 313. Wave plate 313 is used to change the polarization of first photon 320. In one illustrative example, wave plate 313 takes the form of a half-wave plate that is configured to rotate the polarization direction of first photon 320.

First photon 320 may be sent through wave plate 313 towards mirror 314. Mirror 314 directs first photon 320 towards beam splitter 312. Similarly, second photon 322 is sent towards mirror 316. Mirror 316 directs second photon 322 towards beam splitter 312. In other words, mirror 314 and mirror 316 are used to steer first photon 320 and second photon 322, respectively, towards beam splitter 312. Of course, in other illustrative examples, a plurality of optical elements may be used to steer first photon 320 and second photon 322 towards beam splitter 312.

Beam splitter 312 causes entanglement between first photon 320 and second photon 322 such that pair of entangled photons 324 is formed. Pair of entangled photons 324 includes first entangled photon 326 and second entangled photon 328. In some illustrative examples, first entangled photon 326 may be referred to as a transporter photon.

First entangled photon 326 is sent to meet with incoming photon 330 at entanglement remover 300. Both incoming photon 330 and first entangled photon 326 are received at beam splitter 304 within entanglement remover 300. Incoming photon 330 and first entangled photon 326 are interfered at beam splitter 304. Beam splitter 304 may be implemented using, for example, a 50/50 beam splitter.

Detector 306 and detector 308 may be used to measure first output 332 and second output 334, respectively, of beam splitter 304. Detector 306 and detector 308 may each be implemented using, for example, without limitation, control optics, a polarization measurement device, and a light-to-electronic signal converter. The light-to-electronic signal converter may take the form of, for example, without limitation, a photodiode, an avalanche photodiode, a photomultiplier, or some other type of element.

In response to incoming photon 330 and first entangled photon 326 meeting at beam splitter 304 and the measurement of at least one of first output 332 and second output 334 by detector 306 and detector 308, respectively, the entanglement between first entangled photon 326 and second entangled photon 328 is removed to form outgoing photon 336. Simultaneously, the quantum state of incoming photon 330 is transferred to outgoing photon 336.

In this manner, outgoing photon 336 may have the same quantum state as incoming photon 330 such that outgoing photon 336 is relatively indistinguishable from incoming photon 330. The transferring of the quantum state of incoming photon 330 to outgoing photon 336 results in the teleportation of the encrypted information carried by incoming photon 330 to outgoing photon 336. Quantum teleporter 216 outputs outgoing photon 336.

The illustrations of communications network 200 in FIG. 2 and quantum teleporter 216 in FIG. 3 are not meant to imply physical or architectural limitations to the manner in which an illustrative embodiment may be implemented. Other components in addition to or in place of the ones illustrated may be used. Some components may be optional.

The different components shown in FIG. 3 may be illustrative examples of how components shown in block form in FIG. 1 can be implemented as physical structures. Additionally, some of the components in FIG. 3 may be combined with components in FIG. 1, used with components in FIG. 1, or a combination of the two.

Figure 4:
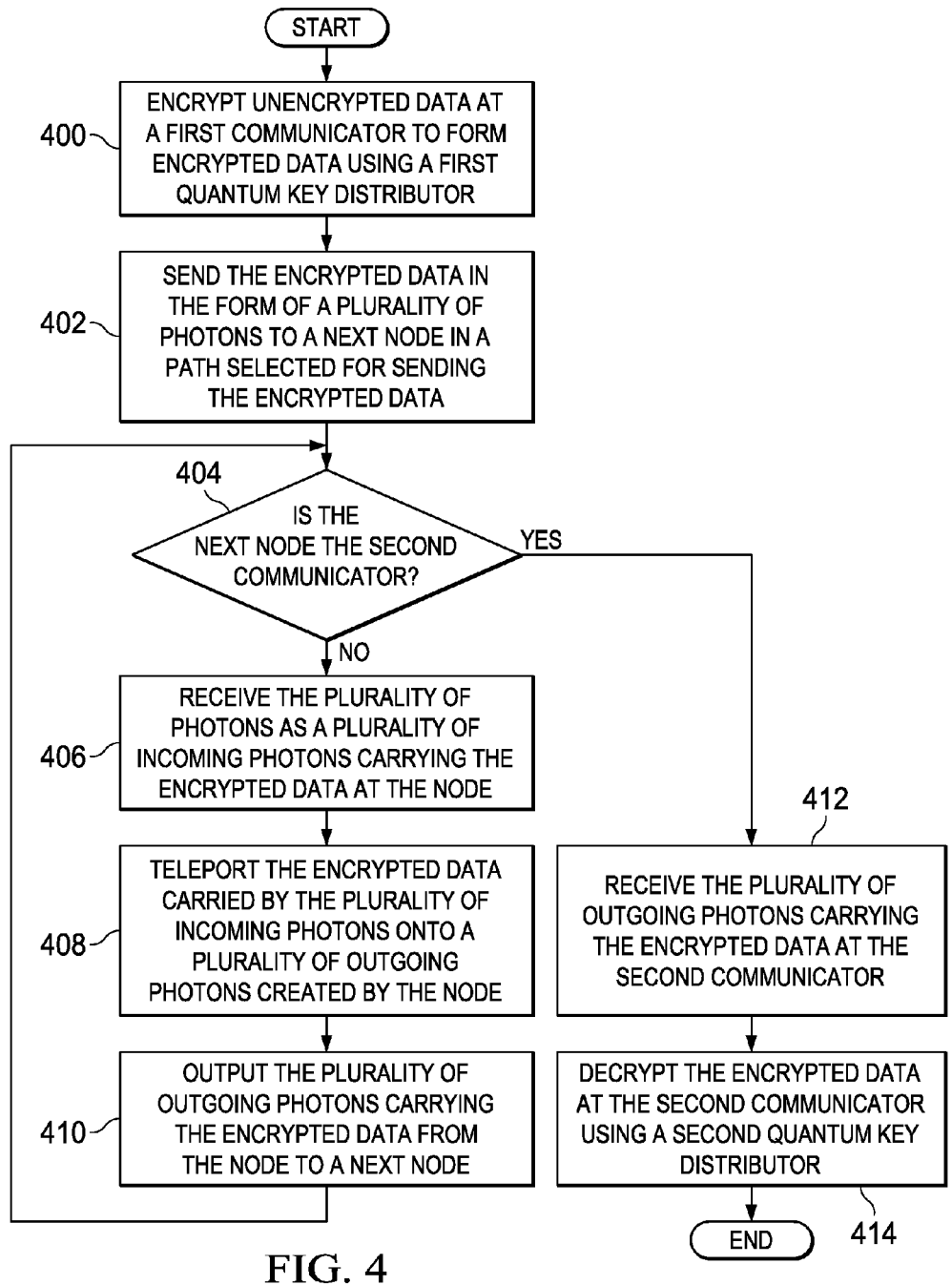
FIG. 4 is an illustration of a process for sending encrypted data from a first communicator to a second communicator in a communications network in the form of a flowchart in accordance with an illustrative embodiment.

With reference now to FIG. 4, an illustration of a process for sending encrypted data from a first communicator to a second communicator in a communications network in the form of a flow chart is depicted in accordance with an illustrative embodiment. The process illustrated in FIG. 4 may be used to send, for example, encrypted data 114 from first communicator 106 to second communicator 108 in FIG. 1.

The process begins by the first communicator encrypting unencrypted data to form encrypted data using a first quantum key distributor (operation 400). Next, the encrypted data is sent to a next node in a path selected for sending the encrypted data in the form of a plurality of photons (operation 402). A determination is made as to whether the next node is the second communicator (operation 404).

If the next node is not the second communicator, the node receives the plurality of photons as a plurality of incoming photons carrying the encrypted data (operation 406). Thereafter, the node teleports the encrypted data carried by the plurality of incoming photons onto a plurality of outgoing photons created by the node (operation 408). The node outputs the plurality of outgoing photons carrying the encrypted data to a next node (operation 410), with the process returning to operation 404 as described above.

With reference again to operation 404, if the next node is the second communicator, the second communicator receives the plurality of outgoing photons carrying the encrypted data (operation 412). The second communicator then decrypts the encrypted data using a second quantum key distributor (operation 414), with the process terminating thereafter.

Figure 5:
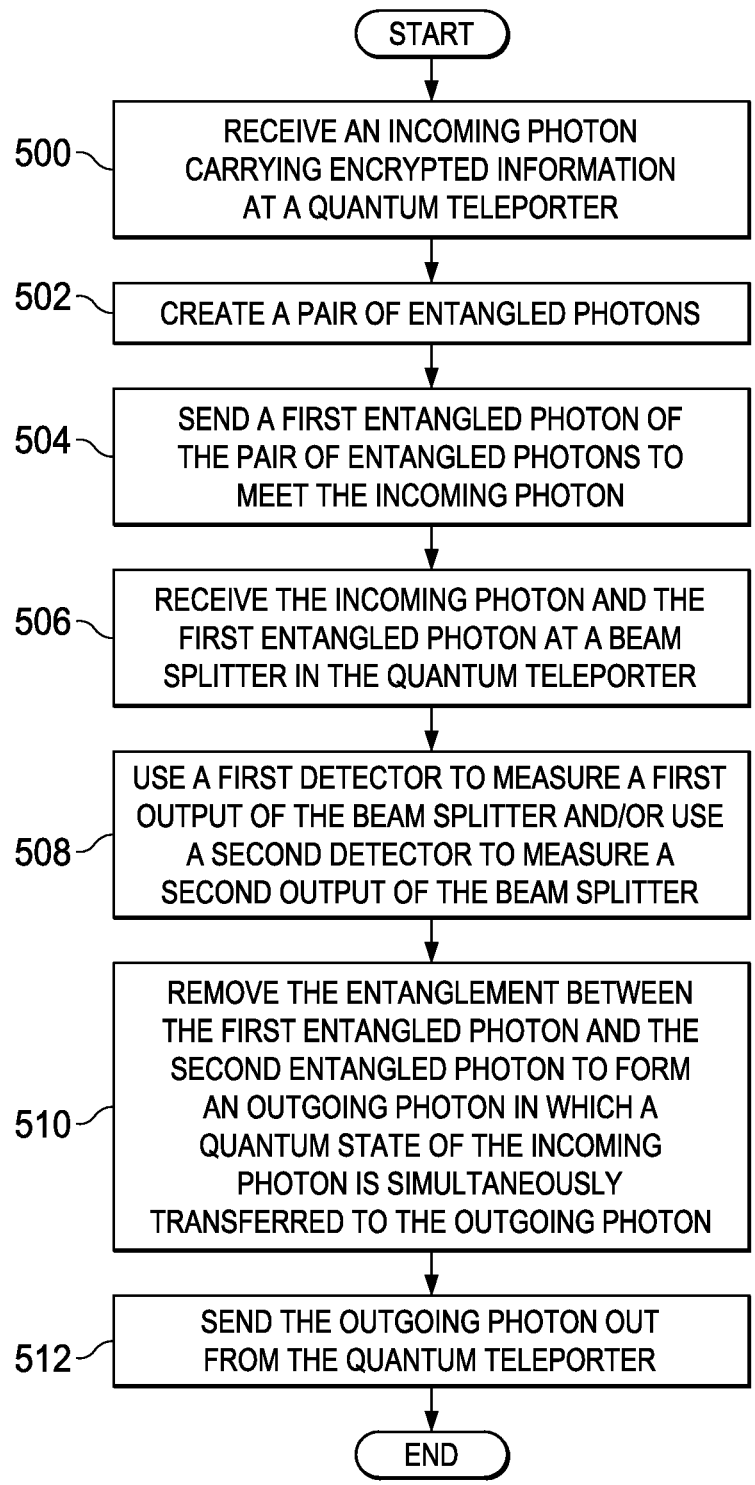
FIG. 5 is an illustration of a process for sending encrypted data across a node in the form of a flowchart in accordance with an illustrative embodiment.

With reference now to FIG. 5, an illustration of a process for sending encrypted data across a node is depicted in the form of a flowchart in accordance with an illustrative embodiment. The process illustrated in FIG. 5 may be used to send, for example, without limitation, encrypted data 114 across node 124 in FIG. 1. Further, the process illustrated in FIG. 5 may be implemented using quantum teleporter 130 in FIG. 1.

The process begins by the quantum teleporter receiving an incoming photon carrying encrypted information (operation 500). A pair of entangled photons is created (operation 502). A first entangled photon of the pair of entangled photons is sent to meet the incoming photon (operation 504). The incoming photon and the first entangled photon are received at a beam splitter in the quantum teleporter (operation 506). A first detector may be used to measure a first output of the beam splitter and/or a second detector may be used to measure a second output of the beam splitter (operation 508).

In response to the incoming photon and the first entangled photon meeting at the beam splitter and the first output and/or the second output of the beam splitter being measured, the entanglement between the first entangled photon and the second entangled photon is removed to form an outgoing photon in which a quantum state of the incoming photon is simultaneously transferred to the outgoing photon (operation 510). In operation 510, transferring the quantum state of the incoming photon to the outgoing photon teleports the encrypted information carried by the incoming photon to the outgoing photon. The outgoing photon is sent out from the quantum teleporter (operation 512), with the process terminating thereafter.

In this manner, the illustrative embodiments described above provide a method for sending quantum encrypted data across nodes without requiring that the nodes have quantum key distribution capabilities. In particular, the quantum encrypted data may remain encrypted while being sent from the first communicator to the second communicator.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a first communicator configured to encrypt unencrypted data to form encrypted data using a first quantum key distributor;
   a second communicator configured to decrypt the encrypted data using a second quantum key distributor;
   a node configured to receive the encrypted data sent from the first communicator and send the encrypted data to the second communicator using quantum teleportation, wherein the encrypted data remains encrypted as the encrypted data passes through the node;
   an entanglement creator configured to create a first photon and a second photon, the first photon and the second photon being in an entangled quantum state, wherein the entanglement creator is configured to transmit the first photon to an entanglement remover and the second photon to one of a next node or the second communicator; and
   an entanglement remover configured to receive both the first photon and an incoming photon transmitted by the first communicator, wherein the entanglement remover is further figured to cause the incoming photon and the first photon to interfere with each other, thereby generating at least one output photon, and wherein the entanglement remover is further configured to subsequently measure a property of the at least one output photon and thereby remove entanglement between the first photon and the second photon and simultaneously transfer a quantum state of the incoming photon to the second photon.

2. The apparatus of claim 1, wherein the node is configured to use communication channels selected from the group consisting of: a wireless communications channel, a wired communications channel, an optical communications channel, and a fiberoptic channel.

3. The apparatus of claim 1, wherein the entanglement creator comprises:
   a coupled photon creator configured to create the first photon and the second photon; and
   a beam splitter configured to entangle the first photon and the second photon.

4. The apparatus of claim 3, wherein the entanglement creator further comprises:
   a plurality of optical elements configured to direct the first photon and the second photon towards the beam splitter.

5. The apparatus of claim 3, wherein the entanglement creator further comprises:
   a wave plate configured to change a polarization of at least one of the first photon and the second photon.

6. The apparatus of claim 1, wherein the entanglement remover comprises:
   a beam splitter, wherein the incoming photon and the first photon meet at the beam splitter.

7. The apparatus of claim 6, wherein the at least one output photon comprises a first output photon created by the beam splitter and a second output photon created by the beam splitter, and wherein the entanglement remover further comprises:
   a first detector configured to measure the first output photon; and
   a second detector configured to measure the second output photon.

8. The apparatus of claim 1, wherein the node belongs to a plurality of nodes that form a communications network, each of the plurality of nodes comprising a corresponding entanglement creator and a corresponding entanglement remover.

9. A method for sending encrypted information across a first node in a communications network, the method comprising:
   creating a first photon and a second photon at the first node;
   entangling the first photon and the second photon in an entangled quantum state at the first node;
   sending the first photon towards a first beam splitter at the first node and sending the second photon towards an output of the first node;
   receiving at the first beam splitter both the first photon and an incoming photon from a transmitting device, the incoming photon containing the encrypted information, wherein interference of the first photon and the incoming photon occurs at the beam splitter;
   outputting from the first beam splitter a first output photon and a second output photon;
   measuring, at the first node, a property of at least one of the first output photon and the second output photon, thereby simultaneously removing entanglement between the first photon and the second photon and also teleporting a quantum state of the incoming photon to the second photon, the quantum state also conveying the encrypted information to the second photon;
   sending the second photon carrying the encrypted information from the output to one of a next node in the communications network or a receiving device in the communications network.

10. The apparatus of claim 1, wherein the entanglement creator and the entanglement remover are both contained in the node, and wherein the node comprises a single node.

11. The method of claim 9, wherein the first node is configured to use communication channels selected from the group consisting of: a wireless communications channel, a wired communications channel, an optical communications channel, and a fiberoptic channel.

12. The method of claim 9, wherein the entanglement creator comprises a coupled photon creator and a beam splitter, and wherein the method further comprises:
   creating the first photon and the second photon using the coupled photon creator; and
   entangling the first photon and the second photon using the beam splitter.

13. The method of claim 12, wherein the entanglement creator further comprises a plurality of optical elements, and wherein the method further comprises:
   directing the first photon and the second photon towards the beam splitter using the plurality of optical elements.

14. The method of claim 12, wherein the entanglement creator further comprises a wave plate, and wherein the method further comprises:
   changing a polarization of at least one of the first photon and the second photon using the wave plate.

15. The method of claim 9, wherein the entanglement remover comprises a beam splitter, wherein the incoming photon and the first photon meet at the beam splitter.

16. The method of claim 15, wherein the at least one output photon comprises a first output photon created by the beam splitter and a second output photon created by the beam splitter, and wherein the entanglement remover further comprises a first detector and a second detector, and wherein the method further comprises:
   measuring the first output photon with the first detector; and measuring the second output photon with the second detector.

17. The method of claim 9, wherein the node belongs to a plurality of nodes that form a communications network, each of the plurality of nodes comprising a corresponding entanglement creator and a corresponding entanglement remover.

18. The method of claim 9 wherein the entanglement creator and the entanglement remover are both contained in the node, and wherein the node comprises a single node.

19. The method of claim 9 further comprising:
receiving the second photon carrying the encrypted information at the one of the next node in the communications network or the receiving device in the communications network.

20. The method of claim 19 further comprising:
decrypting, using a quantum key distributor, the second photon at the one of the next node in the communications network or the receiving device in the communications network.

* * * * *